(12) United States Patent
Dalena et al.

(10) Patent No.: US 9,559,587 B2
(45) Date of Patent: Jan. 31, 2017

(54) HIGH VOLTAGE DC/DC CONVERTER WITH MASTER/SLAVE OUTPUT STAGE

(71) Applicant: Dialog Semiconductor GmbH, Kirchheim/Teck-Nabern (DE)

(72) Inventors: Francesco Dalena, Leghorn (IT); Enrico Pardi, Cascina (IT); Stefano Scaldaferri, Bientina (IT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 14/445,288

(22) Filed: Jul. 29, 2014

(65) Prior Publication Data

US 2015/0194889 A1 Jul. 9, 2015

(30) Foreign Application Priority Data

Jan. 9, 2014 (EP) .................................... 14150649

(51) Int. Cl.
*H02M 3/158* (2006.01)
*H02M 1/088* (2006.01)
*H02M 1/38* (2007.01)

(52) U.S. Cl.
CPC ............. *H02M 3/158* (2013.01); *H02M 1/088* (2013.01); *H02M 1/38* (2013.01); *H02M 3/1584* (2013.01)

(58) Field of Classification Search
CPC ..... G05F 1/56; G05F 1/59; H02M 2001/0045; H02M 3/1584; H02M 3/1588; H02M 7/49; H02M 7/493
USPC ............ 323/268, 269, 271; 363/71; 327/109
See application file for complete search history.

(56) References Cited

U.S. PATENT DOCUMENTS

| 5,099,138 A | * | 3/1992 | Fukunaga | ............... H02M 1/38 327/109 |
| 7,554,384 B2 | * | 6/2009 | Dibene | .................... G06F 1/26 327/108 |
| 2005/0212497 A1 | | 9/2005 | Cha | |

FOREIGN PATENT DOCUMENTS

| EP | 1 524 567 | 4/2005 |
| WO | WO 9729537 | 8/1997 |

OTHER PUBLICATIONS

NCP5355 (Datasheet, "NCP5355 12V Synchronous Buck Power MOSFET Driver", Semiconductor Components Industries, LLC, Dec. 2004).*
FDSS2407 (Datasheet, "FDSS2407 N-Channel Dual MOSFET", Fairchild Semiconductor Corporation, 2004).*

(Continued)

*Primary Examiner* — Jeffrey Gblende
*Assistant Examiner* — Jye-June Lee
(74) *Attorney, Agent, or Firm* — Saile Ackerman LLC; Stephen B. Ackerman

(57) ABSTRACT

The present document relates to DC/DC converters with a modular structure for providing different levels of output currents. A power converter configured to convert electrical power at an input voltage into electrical power at an output voltage is described. The power converter comprises inverter stages with half bridges comprising a high side switches and low side switches which are arranged in series between the input voltage and a reference voltage; and with high side drivers for providing drive signals for the high side switches, subject to a high side control signals at a drive voltage level. In addition, the power converter comprises a level shifting unit configured to convert a high side control signal at a logic voltage level into the high side control signal at the drive voltage level for driving the high side switches.

13 Claims, 4 Drawing Sheets

(56) References Cited

OTHER PUBLICATIONS

European Search Report 14150649.3-1809 Mailed Jul. 4, 2014
Co-pending US Patent DS13-073S, U.S. Appl. No. 14/445,300, filed Jul. 29, 2014, "DC/DC Converter Efficiency Improvement for Low Current Levels," by Francesco Dalena, et al., 41 pgs.
"Gate Drive Methods for IGBTs in Bridge Configurations," by Sujit K. Biswas, et al., Industry Applications Society Annual Meeting, 1994, Conference Record of the 1994 IEEE, USA, Oct. 2, 1994, pp. 1310-1316, XP010124238.

* cited by examiner

HIGH VOLTAGE DC/DC CONVERTER WITH MASTER/SLAVE OUTPUT STAGE

RELATED PATENT APPLICATION

This application is related to U.S. patent application Ser. No. 14/445,300, filed on Jul. 29, 2014, now issued as U.S. Pat. No. 9,431,904, which is herein incorporated by reference in its entirety and is assigned to a common assignee, and which is being filed on the same date as the instant application.

TECHNICAL FIELD

The present document relates to DC (Direct Current)/DC converters. In particular, the present document relates to DC/DC converters with a modular structure for providing different levels of output currents.

BACKGROUND

DC/DC power converters may be used for converting electrical power at an input voltage to electrical power at an output voltage, wherein the input voltage and the output voltage are different. The input voltage may e.g. be in the range of 15V which is typically referred to as a high voltage application.

In DC/DC converters, a plurality of inverter stages of power converters may be arranged in parallel, in order to adapt the power converter to different output currents, i.e. to different loads. The inverter stages which are arranged in parallel may be referred to as "slices". The different slices may be equal with respect to one another. This is beneficial in view of the design of the power converter so as to make the power converter easily adaptable and configurable. On the other hand, the drawback of using equally designed slices, especially for high voltage applications, is that the replicas of inverter stages dissipate current, thereby reducing the total efficiency of the power converter.

SUMMARY

The present document addresses the technical problem of providing a configurable and adaptable power converter with increased power efficiency. According to an aspect, a power converter configured to convert electrical power at an input voltage (at an input of the power converter) into electrical power at an output voltage (at an output of the power converter) is described. The input voltage and the output voltage may be DC voltages, and the power converter may be or may comprise a DC/DC power converter.

The power converter comprises a plurality of inverter stages, wherein the plurality of inverter stages may be arranged in parallel with respect to one another. The number of inverter stages may be increased in order to increase an amount of electrical power which may be provided at the output of the power converter. In other words, the power converter may comprise a pre-determined number of inverter stages and the pre-determined number may depend on an amount of electrical power, which is to be provided at the output of the power converter. By way of example, each inverter stage may be configured to provide a pre-determined inverter current, and a power converter comprising N inverter stages may be configured to provide N times the pre-determined inverter current at the output of the power converter (e.g. N greater than one).

The power converter comprises a first inverter stage with a first half bridge. The first half bridge comprises a first high side switch and a first low side switch which are arranged in series between the input voltage and a reference voltage (e.g. ground). The first high side switch and the first low side switch may be commutated between on-state and off-state in an alternating and mutually exclusive manner to switch a midpoint of the first half bridge (i.e. the midpoint between the first high side switch and the first low side switch) between the level of the input voltage and the level of the reference voltage. The switches may be power switches and may comprise e.g. metal oxide semiconductor transistors. In particular, the high side switch may comprise a p-type metal oxide semiconductor transistor, and/or the low side switch may comprise an n-type metal oxide semiconductor transistor.

The switches may be driven by respective drivers. The drivers may be configured to provide or to draw a gate charge for charging a gate capacitor of the switches. As a result of this, the switches may be put into the on-state (by providing the gate charge) or may be put into the off-state (my drawing the gate charge). In particular, the first inverter stage may comprise a first high side driver for providing a first drive signal for the first high side switch, subject to a high side control signal at a drive voltage level. In a similar manner, the first inverter stage may comprise a first low side driver for providing a first drive signal for the first low side switch, subject to a low side control signal.

The power converter comprises a second inverter stage with a second half bridge comprising a second high side switch and a second low side switch which are arranged in series between the input voltage and the reference voltage (e.g. ground). The second half bridge may exhibit a structure and/or design which is equal to the structure and/or design of the first half bridge. As indicated above, the switches may comprise metal oxide semiconductor transistors. In particular, the high side switch may comprise a p-type metal oxide semiconductor transistor, and/or the low side switch may comprise an n-type metal oxide semiconductor transistor.

Furthermore, the second inverter stage comprises a second high side driver for providing a second drive signal for the second high side switch, subject to the high side control signal at the drive voltage level. In other words, the first and the second drive signals for driving the first and second high side switches may be generated subject to the same high side control signal. The second inverter stage may also comprise a second low side driver for providing a second drive signal for the second low side switch, subject to the low side control signal. In other words, the first and the second drive signals for driving the first and second low side switches may be generated subject to the same low side control signal.

In addition, the power converter comprises a level shifting unit configured to convert a high side control signal at a logic voltage level into the high side control signal at the drive voltage level for driving the first and second high side switches. Hence, a single level shifting unit may be used to drive the high side switches of a plurality of inverter stages. As a result of this, the power consumption of the power converter may be reduced. Furthermore, the space requirements of the power converter may be reduced.

The level shifting unit may be provided as part of the first inverter stage. The first inverter stage may then be referred to as a master inverter stage. The second inverter stage and possibly further inverter stages do not comprise a level shifting unit, and receive the high side control signal at the drive voltage level from the level shifting unit comprised within the master inverter stage. The second inverter stage and any further inverter stages may therefore be referred to as slave inverter stages.

An offset between the drive voltage level and the logic voltage level may depend on a level of the input voltage. In particular, the drive voltage level may increase with increasing level of the input voltage. On the other hand, the logic voltage level is typically independent of the level of the input voltage.

The power converter may comprise only a single level shifting unit for providing the high side control signal at the drive voltage level for the high side switches of a plurality of inverter stages of the power converter. As indicated above, this is beneficial with respect to reducing the space requirement and power consumption of the power converter. In particular, the power converter may comprise only a single level shifting unit (e.g. as part of a master inverter stage) for providing the high side control signal at the drive voltage level for the high side switches of all the inverter stages of the power converter.

The first inverter stage may further comprise a first high side feedback unit configured to provide a first high side feedback signal by sensing the first drive signal of the first high side switch. As such, the first high side feedback signal may be indicative of the first drive signal of the first high side switch. In a similar manner, the second inverter stage may further comprise a second high side feedback unit configured to provide a second high side feedback signal by sensing the second drive signal of the second high side switch. As such, the second high side feedback signal may be indicative of the second drive signal of the second high side switch.

The power converter may further comprise a high side combining unit configured to provide a combined high side feedback signal by combining the first and second high side feedback signals. The high side combining unit may comprise an AND gate for combining the first and second high side feedback signals. In particular, the combined high side feedback signal may be at high level only if all contributing high side feedback signals are at high level, and/or the combined high side feedback signal may be at low level only if all contributing high side feedback signals are at low level. As such, the combined high side feedback signal indicates whether all contributing high side switches are in on-state (or in off-state), or whether at least one contributing high side switch is not in on-state (or in off-state).

In addition, the power converter may comprise an inverse level shifting unit configured to shift the combined high side feedback signal from the drive voltage level to the logic voltage level. As a result of combining the individual high side feedback signals from the individual inverter stages, the power converter may only make use of (e.g. may only comprise) a single inverse level shifting unit for a plurality of inverter stages (e.g. for all inverter stages). As a result of this, the power and/or space consumption of the power converter may be reduced.

The first inverter stage may also comprise a first low side feedback unit configured to provide a first low side feedback signal by sensing the first drive signal for the first low side switch. As such, the first low side feedback signal may be indicative of the level of the first drive signal for the first low side switch. In a similar manner, the second inverter stage may comprise a second low side feedback unit configured to provide a second low side feedback signal by sensing the second drive signal for the second low side switch. As such, the second low side feedback signal may be indicative of the level of the second drive signal for the second low side switch.

In addition, the power converter may comprise a low side combining unit configured to provide a combined low side feedback signal by combining the first and second low side feedback signals. The low side combining unit may comprise an AND gate for combining the first and second low side feedback signals. In particular, the combined low side feedback signal may be at high level only if all contributing low side feedback signals are at high level, and/or the combined low side feedback signal may be at low level only if all contributing low side feedback signals are at low level. As such, the combined low side feedback signal indicates whether all contributing low side switches are in on-state (or in off-state), or whether at least one contributing low side switch is not in on-state (or in off-state).

The power converter may further comprise a logic unit configured to provide the high side control signal at the logic voltage level, subject to one or more controller signals from a controller of the power converter. The one or more controller signals may be indicative of a duration of the on-state/off-state of the high side switches and low side switches of the first and second inverter stages. For this purpose, the one or more controller signals may comprise pulse width modulated (pwm) and/or pulse frequency modulated (pfm) signals. The logic unit may also be configured to provide a low side control signal for driving the first and second low side switches, subject to the one or more controller signals from the controller of the power converter.

Hence, a single logic unit may be used to control the switches of a plurality of inverter stages. In other words, the power converter may comprise only a single logic unit for providing the high side control signal for the high side switches of a plurality of inverter stages of the power converter. In particular, the power converter may comprise only a single logic unit for providing the high side control signal for the high side switches of all the inverter stages of the power converter. The logic unit may be comprised within the master inverter stage. As a result of this, the one or more slave inverter stages do not comprise a logic unit. The provision of a reduced number of logic units is typically beneficial with respect to power consumption and space requirements of the power converter.

The logic unit may be further configured to receive the combined high side feedback signal at the logic voltage level and to receive the combined low side feedback signal. In addition, the logic unit may be configured to provide the high side control signal and the low side control signal, such that neither the first nor the second high side switches are in on-state concurrently with either one of the first and second low side switches. In other words, the logic unit may be configured to prevent a shoot-through situation. In particular, the logic unit may be configured to prevent a shoot-through situation which occurs across different inverter stages. This is beneficial for increasing the stability and the life time of the power converter. Furthermore, this is beneficial with respect to reducing the power consumption of the power converter.

The midpoint between the first high side switch and the first low side switch (of the first inverter stage) is typically coupled with the midpoint between the second high side switch and the second low side switch (of the second inverter stage). This coupled midpoint may be used to provide the electrical power towards the output of the power converter. In particular, the electrical power at the output voltage may be drawn from the coupled midpoint. For this purpose, the power converter may further comprise a filter unit (e.g. an LC circuit) coupled to the midpoint for providing the electrical power at the output voltage.

An output of the first high side driver may be coupled with an output of the second high side driver. This may be beneficial for providing a balance between the first and second drive signals for the first and second high side switches, respectively. In particular, this may ensure a concurrent transition from on-state to off-state and vice versa of the plurality of parallel high side switches. In a similar manner, an output of the first low side driver may be coupled with an output of the second low side driver, thereby providing a balance between the first and second drive signals for the first and second low side switches, respectively. The coupling of the outputs of the high side drivers and/or the output of the low side drivers is optional.

According to a further aspect, a method for driving the high side switches of a power converter comprising a first and a second inverter stage is described. The method comprises providing a first half bridge for the first inverter stage, wherein the first half bridge comprises a first high side switch and a first low side switch which are arranged in series between an input voltage and a reference voltage. Furthermore, the method comprises providing a first high side driver for generating a first drive signal for the first high side switch, subject to a high side control signal at a drive voltage level. In addition, the method comprises providing a second half bridge for the second inverter stage, wherein the second half bridge comprises a second high side switch and a second low side switch which are arranged in series between the input voltage and the reference voltage. Furthermore, the method comprises providing a second high side driver for generating a second drive signal for the second high side switch, subject to the high side control signal at the drive voltage level. In addition, the method comprises providing a level shifting unit configured to convert a high side control signal at a logic voltage level into the high side control signal at the drive voltage level for driving the first and second high side switches.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1A:
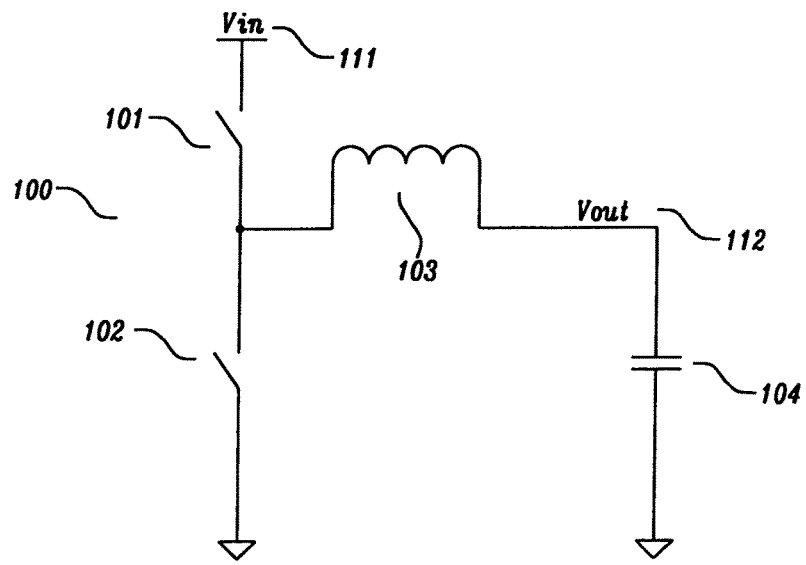
FIG. 1a shows a block diagram of an example buck converter.

As outlined above, the present document relates to configurable DC/DC power converters with increased power efficiency. FIG. 1a shows a block diagram of an example output stage 100 of a power converter. In the illustrated example, the output stage 100 comprises a buck converter. In particular, the output stage 100 of the illustrated DC/DC converter comprises an inverter with two power switches 101, 102. The two power switches 101, 102 (i.e. the inverter) form a half bridge comprising a high side switch 101 and a low side switch 102. The half bridge may be arranged between an input voltage 111 and ground. The power switches 101, 102 may be closed and opened in an alternating and mutually exclusive manner, in order to generate an alternating signal at a midpoint between the high side switch 101 and the low side switch 102. The inverter drives an inductor 103 which forms an LC circuit in conjunction with an output capacitor 104. The LC circuit filters the switching component of the alternating signal which is generated by the inverter. The voltage at a midpoint between the inductor 103 and the capacitor 104 corresponds to the output voltage 112 of the output stage 100.

Figure 1B:
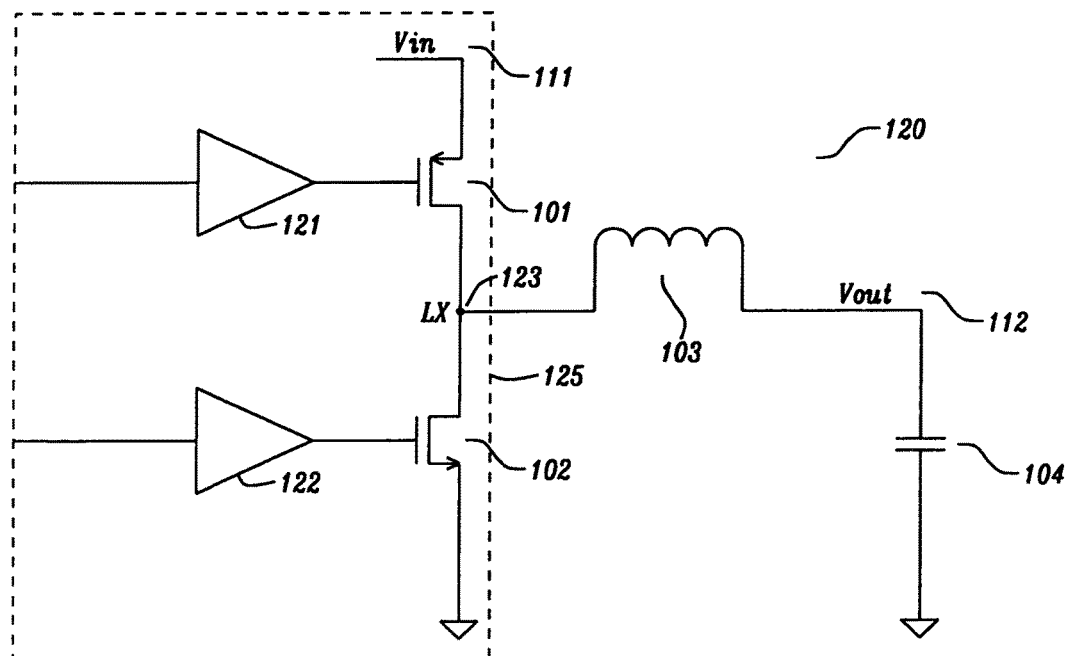
FIG. 1b shows a circuit diagram of an example buck converter using CMOS technology.

FIG. 1b shows an output stage 120 implemented in CMOS technology. In CMOS (Complementary Metal Oxide Semiconductor) technology the two power switches 101, 102 are implemented as MOS switches. In particular, the low side switch 102 may be implemented as an NMOS switch and the high side switch 101 may be implemented as a PMOS switch. It should be noted that the high side switch 101 may also be implemented as an NMOS switch. Each power switch 101, 102 is driven by a respective driver 121, 122 which shape a gate voltage of the switches 101, 102, in order to provide an appropriate balance at the node "LX" 123 of the inverter, wherein the node 123 corresponds to the midpoint of the half bridge between the high side switch 101 and the low side switch 102. The driver 121 for the high side switch 101 may be referred to as the high side driver, and the driver 122 for the low side switch 102 may be referred to as the low side driver. The gate voltage which is generated by the high side driver 121 may be referred to as the drive signal for the high side switch 101, and the gate voltage which is generated by the low side driver 122 may be referred to as the drive signal for the low side switch 102.

Figure 2:
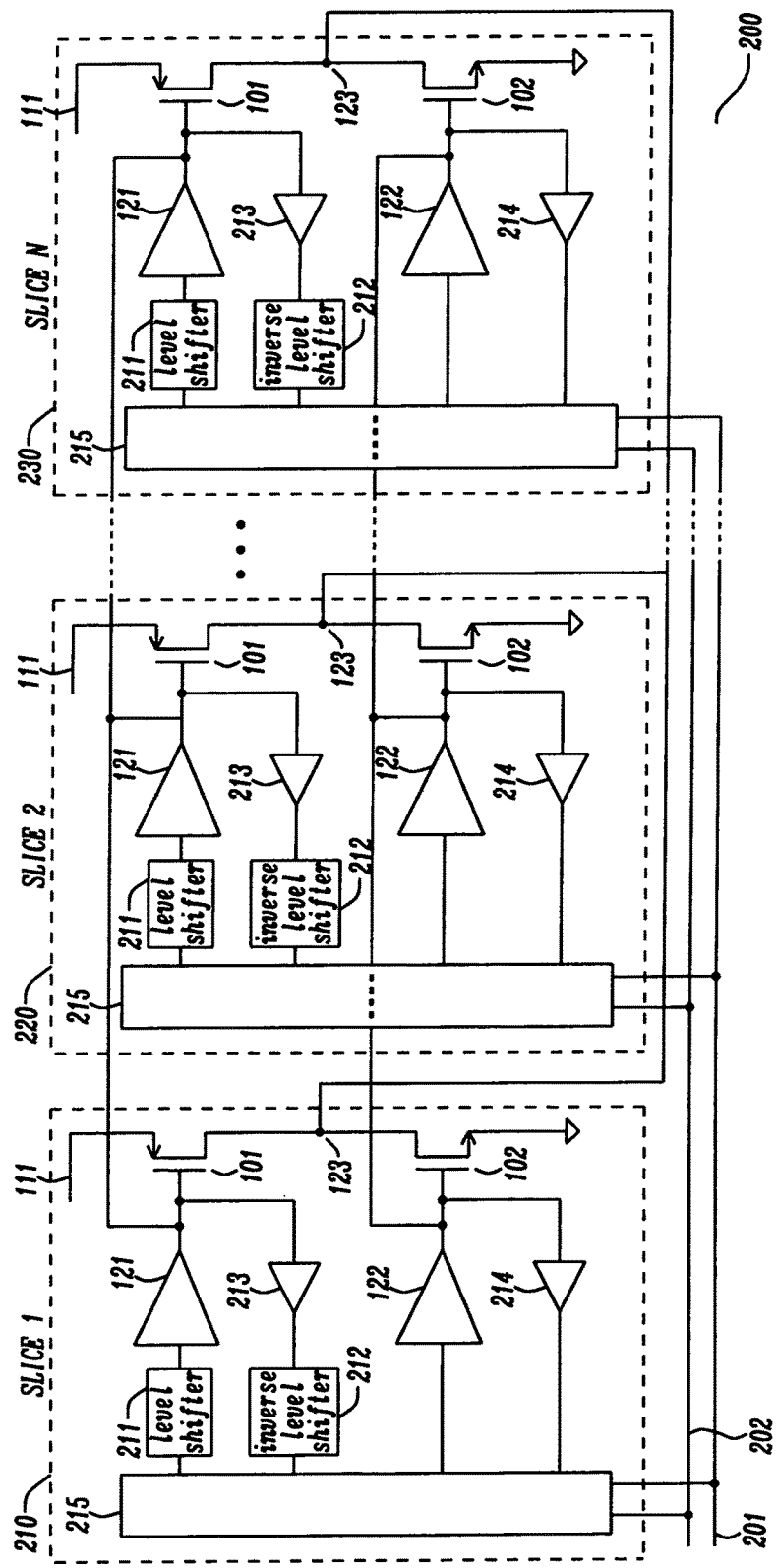
FIG. 2 shows a circuit diagram of an example power converter comprising a plurality of equal inverter stages.

In a high voltage power converter the high side switch 101 (i.e. the high side pass transistor) may need to be driven with a gate voltage (i.e. a drive signal) which is related to the input voltage 111. Due to the use of relatively high input voltages 111 in the case of high voltage power converters, the logic drive signal may need to be up-shifted in order to drive the high side driver 121 at a voltage level which is sufficiently high relative to the input voltage 111. For this purpose, an inverter stage may comprise a level shifting unit 211 configured to shift the a control signal for the high side driver 121 from a logic voltage level to a drive voltage level, wherein the logic voltage level is lower than the drive voltage level. This is illustrated in FIG. 2 which shows a block diagram of a power converter 200 comprising a plurality of inverter stages 210, 220, 230. It can be seen that the inverter stages 210, 220, 230 each comprise a level shifting unit 211 between a respective logic unit 215 and the respective high side driver 121.

As outlined above, a power converter 200 may comprise a plurality of inverter stages 210, 220, 230 (also referred to as slices) which are arranged in parallel, in order to enable the power converter 200 to drive relatively large loads. The use of different numbers of inverter stages 210, 220, 230 makes the power converter 200 modular and easily configurable for different load current requirements.

The power converter 200 of FIG. 2 comprises N parallel inverter stages 210, 220, 230, with N greater than 1. The inverter stages 210, 220, 230 are designed in an equal manner. In particular, each inverter stage 210, 220, 230 comprises a half bridge or inverter with a high side switch 101 and a low side switch 102, and with respective drivers 121, 122. The high side switch 101 and the low side switch 102 of an inverter are arranged in series between the input voltage 111 and ground. The midpoints 123 between the inverters of the different inverter stages 210, 220, 230 may be coupled with one another and with an inductor 103 (as illustrated in FIG. 1b).

Each inverter stage 210, 220, 230 further comprises a level shifting unit 211 which is configured to shift the level of the control signal from a logic voltage level to a drive voltage level. The control signal (at the logic voltage level) may be generated by the logic unit 215 of an inverter stage 210, 220, 230. The control signal may be generated based on one or more controller signals 201, 202 from a controller (not shown) of the power converter 200. The one or more controller signals 201, 202 may comprise a pulse width modulated (pwm) and/or a pulse frequency modulated (pfm) signal. In particular, the one or more controller signals 201, 202 may comprise a controller signal 201 for enabling (i.e. closing) the high side switch 101 and/or a controller signal 202 for enabling (i.e. closing) the low side switch 102.

The logic unit 215 of an inverter stage 210, 220, 230 may be configured to generate the control signals for the high side switch 101 and for the low side switch 201. The control signal for the high side switch 101 may be referred to as the high side control signal and the control signal for the low side switch 102 may be referred to as the low side control signal.

The control signals may be generated such that a shoot-through of the respective inverter stage 210, 220, 230 is prevented. A shoot-through of an inverter stage 210, 220, 230 may occur if the high side switch 101 and the low side switch 102 of the inverter stage 210, 220, 230 are closed concurrently, thereby generating a short-circuit between the input voltage 111 and ground. Such a shoot-through may be avoided by ensuring that the high side switch 101 of the inverter stage 210, 220, 230 is triggered to be closed only once the low side switch 102 of the inverter stage 210, 220, 230 is open, and vice versa. For this purpose, the inverter stages 210, 220, 230 may comprise feedback units 213, 214 which are configured to provide a feedback to the logic unit 215 regarding the drive signals (i.e. the gate voltages) of the switches 101, 102, respectively. In particular, an inverter stage 210, 220, 230 may comprise a high side feedback unit 213 for providing a feedback (i.e. a high side feedback signal) regarding the drive signal of the high side switch 101 to the logic unit 215. The high side feedback signal may be level shifted from the drive voltage level to the logic voltage level using an inverse level shifting unit 212. Furthermore, an inverter stage 210, 220, 230 may comprise a low side feedback unit 214 for providing a feedback (i.e. a low side feedback signal) regarding the drive signal of the low side switch 101 to the logic unit 215. As the drive signal of the low side switch 101 is typically related to ground, no level shifting is required for the low side switch 101.

The drawback of using equal slices 210, 220, 230 is that each slice 210, 220, 230 contributes to the total power dissipation of the power converter 200 in a static and dynamic manner. A significant portion of the static power dissipation of a slice 210, 220, 230 is typically due to the level shifting which is performed in each slice 210, 220, 230, in order to drive the high side switches 101 at the drive voltage level.

Figure 3:
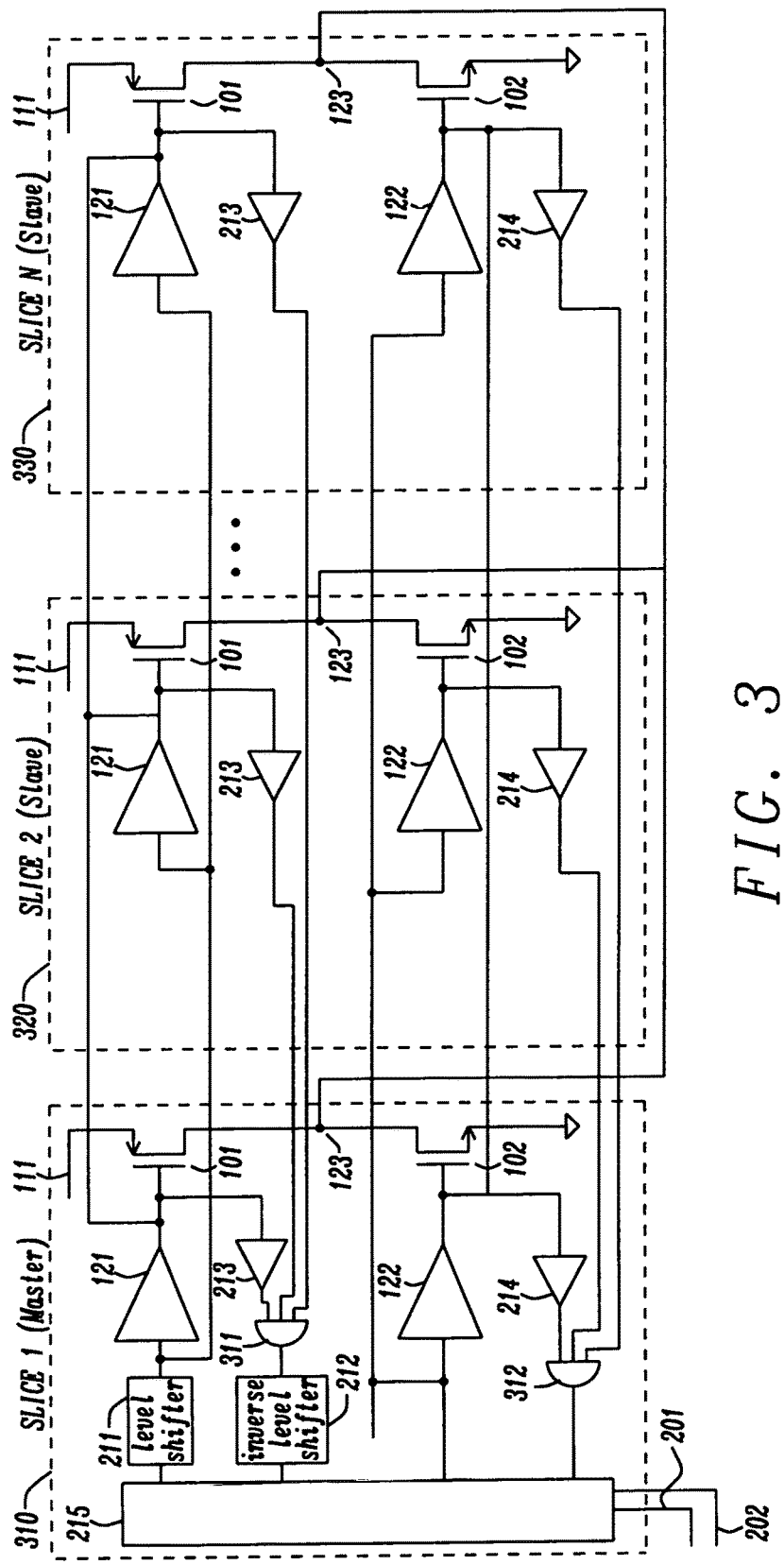
FIG. 3 shows a circuit diagram of an example power converter comprising a master/slave arrangement of inverter stages.

In view of the above, the present document describes a power converter comprising a plurality of parallel inverter stages, wherein at least some of the inverter stages have a different structure. In particular, it is proposed to make use of a power converter which comprises at least one master inverter stage, as well as one or more slave inverter stages, which are arranged in parallel. FIG. 3 shows a block diagram of an example power converter 300 comprising a master inverter stage (or a master slice) 310, as well as a plurality of slave inverter stages (or slave slices) 320, 330.

The master inverter stage 310 comprises a logic unit 215 for generating the control signals at logic voltage level for the high side switches 101 and the low side switches 102 of the master inverter stage 310 and of the one or more slave inverter stages 320, 330. Furthermore, the master inverter stage 310 comprises a level shifting unit 211 for converting the high side control signal from the logic voltage level to the drive voltage level. The high side control signal at drive voltage level may be provided to the high side driver 121 of the master inverter stage 310 and to the high side drivers 121 of the one or more slave inverter stages 320, 330. Hence, the power converter 300 comprises only a single level shifting unit 211 (within the master inverter stage 310) for a plurality of inverter stages 310, 320, 330, thereby reducing the power dissipation of the power converter 300.

In a similar manner, the master inverter stage 310 may comprise an inverse level shifting unit 212 for converting the high side feedback signal from the drive voltage level to the logic voltage level. Furthermore, the master inverter stage 310 may comprise a combining unit 311 for combining the high side feedback signals from the master inverter stage 310 and from the one or more slave inverter stages 320, 330. The combining unit 311 may be configured to generate a single combined high side feedback signal from the high side feedback signals of the master inverter stage 310 and of the one or more slave inverter stages 320, 330. In particular, the combining unit 311 may comprise an AND gate configured to generate the combined high side feedback signal to be at low level only subject to all contributing high side feedback signals being at low level, and to be at high level only subject to all contributing high side feedback signals being at high level. The inverse level shifting unit 212 may be configured to shift the level of the combined high side feedback signal from the drive voltage level to the logic voltage level.

Furthermore, the master inverter stage 310 may comprise a low side combining unit 312 (e.g. an AND gate) configured to generate a combined low side feedback signal from the low side feedback signal of the master inverter stage 310 and of the one or more slave inverter stages 320, 330.

The logic unit 215 of the master inverter stage 310 may be configured to receive the combined high side feedback signal and the combined low side feedback signal. Furthermore, the logic unit 215 may be configured to prevent a shoot-through of the inverter stages 310, 320, 330 based on the combined high side feedback signal and based on the combined low side feedback signal. In particular, the logic unit 215 may be configured to ensure that none of the high side switches 101 of the power converter 300 is switched on, while any one of the low side switches 102 of the power converter 300 is still on, and/or that none of the low side switches 102 of the power converter 300 is switched on, while any one of the high side switches 101 of the power converter 300 is still on. Hence, the logic unit 215 is configured to prevent shoot-through situations that may occur across different inverter stages 310, 320, 330 (e.g. because the high side switch 101 of a first inverter stage 320 and the low side switch 102 of a second inverter stage 330 are in on-state concurrently). Due to its capacity for preventing shoot-through situations, the logic unit 215 may also be referred to as an anti shoot-through unit.

As can be seen from FIG. 3, the slave inverter stages 320, 330 do not comprise level shifting units 211 and inverse level shifting units 212. Such units 211, 212 are only comprised within the master inverter stage 310. As a result of this, the power dissipation of the power converter 300 is substantially reduced.

Furthermore, the slave inverter stages 320, 330 do not comprise logic units 215 for generating the drive signals and for preventing shoot-through. Instead, the power converter 300 of FIG. 3 comprises only a single logic unit 215 within the master inverter stage 310, as well as combining units 311, 312 for combining the feedback signals from the different inverter stages 310, 320, 330. As a result of this, shoot-through protection can be improved, because in contrast to the structure of FIG. 2, the structure of FIG. 3 allows the detection of a shoot-through across different inverter stages 320, 330, which typically cannot be detected using the structure of FIG. 2. Furthermore, the use of only a single logic unit 215 is beneficial with respect to power and space consumption.

In other words, it is proposed to provide a power converter 300 which comprises only a single slice 310 (referred to as the master slice) having the complete functionality of an inverter stage (notably with respect to level shifting and shoot-through prevention). The other slices (referred to as the slave slices) only comprise the power switches 101, 102 and the respective drivers 121, 122. This slice configuration allows for an improved efficiency and for a centralized inverter stage control. In particular, the efficiency improvement is due to the fact that the slave slices do not comprise level shift devices, thereby reducing energy consumption during normal operation of the power converter 300.

As outlined above, the logic unit 215 may be used for shoot-through protection. The power converter 300 of FIG. 3 makes use of only a single logic unit 215 for providing shoot-through protection for a plurality of inverter stages 310, 320, 330. As a result of this, the required silicon area for the logic of the power converter 300 may be reduced.

Figure 4:
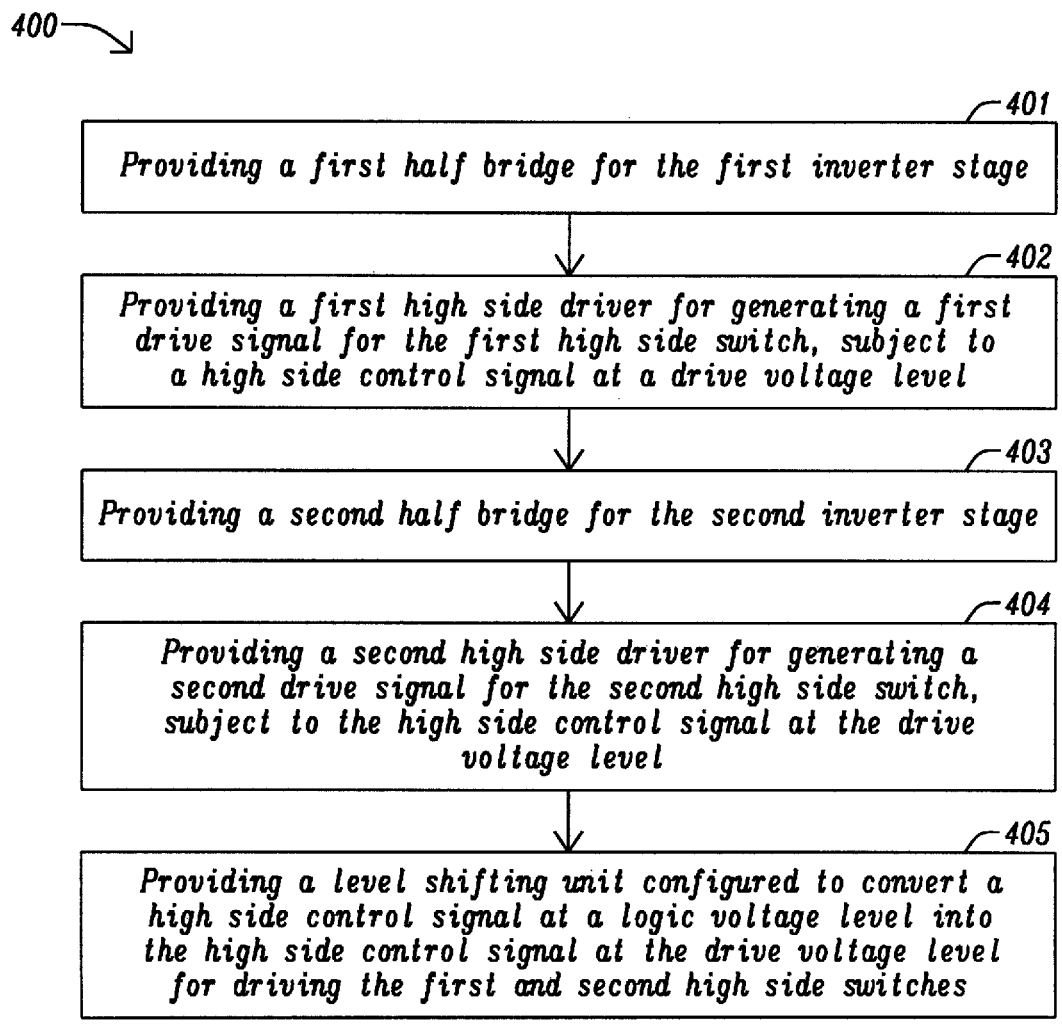
FIG. 4 shows a flow chart of an example method for providing a configurable power converter.

FIG. 4 shows a flow chart of an example method 400 for driving the high side switches 101 of a power converter 300 comprising a first and a second inverter stage 310, 320. The method 400 comprises providing 401 a first half bridge for the first inverter stage 310. The first half bridge comprises a first high side switch 101 and a first low side switch 102 which are arranged in series between the input voltage 111 and a reference voltage (e.g. ground). Furthermore, the method 400 comprises providing 402 a first high side driver for generating a first drive signal for the first high side switch, subject to a high side control signal at a drive voltage level. In addition, the method 400 comprises providing 403 a second half bridge for the second inverter stage 320, wherein the second half bridge comprises a second high side switch 101 and a second low side switch 102 which are arranged in series between the input voltage 111 and the reference voltage. The method 400 further comprises providing 404 a second high side driver 121 for generating a second drive signal for the second high side switch 101, subject to the high side control signal at the drive voltage level. In addition, the method 400 comprises providing 405 a level shifting unit 211 configured to convert a high side control signal at a logic voltage level into the high side control signal at the drive voltage level for driving the first and second high side switches 101.

In the present document, an architecture of a modulator and configurable DC/DC power converter has been described. The power converter makes use of a master inverter stage comprising centralized control logic and/or centralized level shifting. As a result of this, the size of the power converter may be reduced and/or the power consumption of the power converter may be reduced.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert electrical power at an input voltage into electrical power at an output voltage, wherein the power converter comprises
   a first inverter stage with
      a first half bridge comprising a first high side switch and a first low side switch which are arranged in series between the input voltage and a reference voltage; and
      a first high side driver for providing a first drive signal for the first high side switch, subject to a high side control signal at a drive voltage level;
      a first high side feedback unit configured to provide a first high side feedback signal by sensing the first drive signal for the first high side switch;
   a second inverter stage with
      a second half bridge comprising a second high side switch and a second low side switch which are arranged in series between the input voltage and the reference voltage; and
      a second high side driver for providing a second drive signal for the second high side switch, subject to the high side control signal at the drive voltage level; and
      a second high side feedback unit configured to provide a second high side feedback signal by sensing the second drive signal for the second high side switch; and
   a single level shifting unit configured to convert a high side control signal at a logic voltage level into the high side control signal at the drive voltage level for driving the first and second high side switches;
   a high side combining unit configured to provide a combined high side feedback signal by combining the first and second high side feedback signals; wherein the high side combining unit comprises an AND gate for combining the first and second high side feedback signals; and
   an inverse level shifting unit configured to shift the combined high side feedback signal from the drive voltage level to the logic voltage level.

2. The power converter of claim 1, wherein an offset between the drive voltage level and the logic voltage level depends on a level of the input voltage.

3. The power converter of claim 1, wherein
the first inverter stage further comprises a first low side feedback unit configured to provide a first low side feedback signal by sensing a first drive signal for the first low side switch;
the second inverter stage further comprises a second low side feedback unit configured to provide a second low side feedback signal by sensing a second drive signal for the second low side switch;
the power converter further comprises a low side combining unit configured to provide a combined low side feedback signal by combining the first and second low side feedback signals.

4. The power converter of claim 3, wherein the low side combining unit comprises an AND gate for combining the first and second low side feedback signals.

5. The power converter of claim 3, wherein
the power converter further comprises a logic unit configured to provide the high side control signal at the logic voltage level, subject to one or more controller signals from a controller of the power converter; and
the logic unit is configured to provide a low side control signal for driving the first and second low side switches.

6. The power converter of claim 5, wherein the logic unit is configured to
receive the combined high side feedback signal at the logic voltage level;
receive the combined low side feedback signal; and
provide the high side control signal and the low side control signal, such that neither the first nor the second high side switches are in on-state concurrently with either one of the first and second low side switches.

7. The power converter of claim 5, wherein
the power converter comprises only a single logic unit for providing the high side control signal for the high side switches of a plurality of inverter stages of the power converter; or
the power converter comprises only a single logic unit for providing the high side control signal for the high side switches of all the inverter stages of the power converter.

8. The power converter of claim 1, wherein
a midpoint between the first high side switch and the first low side switch is coupled with a midpoint between the second high side switch and the second low side switch; and
the electrical power at the output voltage is drawn from the midpoint.

9. The power converter of claim 8, further comprising a filter unit coupled to the coupled midpoints for providing the electrical power at the output voltage.

10. The power converter of claim 1, wherein
the power converter comprises a pre-determined number of inverter stages; and
the pre-determined number depends on an amount of electrical power at the output voltage, which is to be provided by the power converter.

11. The power converter of claim 1, wherein
the high side switches comprises a p-type metal oxide semiconductor transistor; or
the low side switches comprises an n-type metal oxide semiconductor transistor.

12. The power converter of claim 1, wherein an output of the first high side driver is coupled with an output of the second high side driver.

13. A method for driving the high side switches of a power converter comprising a first and a second inverter stage, the method comprising
providing a first half bridge for the first inverter stage, wherein the first half bridge comprises a first high side switch and a first low side switch which are arranged in series between an input voltage and a reference voltage;
providing a first high side driver for generating a first drive signal for the first high side switch, subject to a high side control signal at a drive voltage level;
providing a first high side feedback unit configured to provide a first high side feedback signal by sensing the first drive signal for the first high side switch;
providing a second half bridge for the second inverter stage, wherein the second half bridge comprises a second high side switch and a second low side switch which are arranged in series between the input voltage and the reference voltage;
providing a second high side driver for generating a second drive signal for the second high side switch, subject to the high side control signal at the drive voltage level;
a second high side feedback unit configured to provide a second high side feedback signal by sensing the second drive signal for the second high side switch;
providing a single level shifting unit configured to convert a high side control signal at a logic voltage level into the high side control signal at the drive voltage level for driving the first and second high side switches;
providing a high side combining unit configured to provide a combined high side feedback signal by combining the first and second high side feedback signals; wherein the high side combining unit comprises an AND gate for combining the first and second high side feedback signals; and
providing an inverse level shifting unit configured to shift the combined high side feedback signal from the drive voltage level to the logic voltage level.

* * * * *